Patented Apr. 9, 1946

2,398,321

UNITED STATES PATENT OFFICE 2,398,321

COPOLYMERS OF DIOLEFINIC COMPOUNDS

David T. Mowry, Dayton, Ohio, assignor to Monsanto Chemical Company, a corporation of Delaware No Drawing. Application July 5, 1943, Serial No. 493,569

11 Claims. (Cl. 260—80)

This invention relates to synthetic rubber-like masses having improved properties and methods of preparing the same. More particularly it relates to new copolymerization products of butadiene and its derivatives with certain unsaturated nitriles.

According to the present invention new artificial, rubbery products having improved mechanical strength, higher thermal stability and greater resistance to solvents than do polybutadienes and previously known copolymerization products of butadiene compounds, are prepared by the polymerization of at least one diolefinic compound having the general structure:

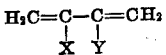

where X and Y stand for halogen, hydrogen or methyl, in admixture with one or more unsaturated nitriles having the general structure:

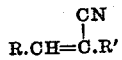

wherein R stands for a substituted or unsubstituted phenyl radical and R' stands for one of the group consisting of CN or COOX, where X denotes a hydrocarbon radical of from 1 to 5 carbon atoms.

Examples of compounds suitable for the present invention are: benzalmalononitrile, methyl alpha-cyanocinnamate, ethyl alpha-cyanocinnamate, propyl (and isopropyl) alpha-cyanocinnamate, butyl (and isobutyl) alpha-cyanocinnamate and amyl (and isoamyl) alpha-cyanocinnamate.

Although it is well known that rubbery products may be obtained by polymerizing butadiene or its derivatives with a variety of unsaturated organic compounds containing olefinic linkages, the unsaturated compounds used for this purpose in the prior art have generally been polymerizable compounds containing a vinyl or vinylidene group like acrylonitrile or methacrylonitrile which compounds are able to polymerize alone, i. e., in the absence of additional polymerizable compounds such as butadiene or its derivatives. On the other hand, unsaturated nitriles having the general structure given above do not undergo polymerization or auto-condensation under ordinary conditions.

I have now made the surprising discovery that when the comparatively stable nitriles of the present invention are subjected to polymerizing conditions in the presence of butadiene or its derivatives, nitrogenous, rubbery, copolymerization products are obtained possessing valuable properties. Moreover, I have found that the presence of these ordinarily unpolymerizable unsaturated nitriles in the monomeric mixture tends to accelerate rather than inhibit the polymerizing step, such monomeric mixtures polymerizing more rapidly than do the butadienes alone. The rapid participation of the present unsaturated nitriles in the polymerizing reaction is shown by the fact that nitrogen analysis of the copolymer shows a higher nitrile content in the final product than would be indicated by the ratio of diolefin to nitrile in the monomeric mixture.

The present copolymers range from elastic to hard, rubber-like, white solids or powders, depending on the polymerization method employed. They are insoluble in all customarily employed solvents, for example, benzene, dioxane, gasoline, acetone, ethyl acetate or ethylene chloride, while polymeric butadienes as well as previously known butadienes are dissolved or swollen by some or all of these materials. The present copolymers are characterized by high thermal stability, being entirely unaffected by heating to temperatures of up to about 150° C. at which temperatures some of the copolymers begin to soften. The melting points of the copolymers generally lie at temperatures of above 250° C. Rubber-like materials compounded therefrom show great mechanical strength and a high degree of resistance to abrasion.

The present copolymers are very plastic and easily workable on rolls so that they can be readily incorporated with fillers, such as carbon black, zinc oxide, and the like, vulcanizing agents, such as sulphur, vulcanization accelerators, plasticizing agents, dyestuffs and other ingredients as applied in vulcanization processes. Upon vulcanization the present copolymers have excellent soft or hard rubber-like properties, depending upon the vulcanizing procedure.

The polymerization mixture is preferably prepared by mixing together the unsaturated nitrile and the diolefinic compound, and if desired, a minor proportion of a mono-olefinic compound, in a pressure vessel in the presence of an aqueous solution of an emulsifying agent such as soap or alkali metal salts of alkylated benzene or naphthalene sulfonic acid. The proportion of the nitrile employed may be from 1% to 50% by weight of the monomeric mixture, although for the preparation of rubbery products of improved properties, it is generally desirable to employ at least 10% and usually at least 20% or 30% of the nitrile, but less than 50% by weight thereof. The balance of the mixture may consist wholly of the diolefinic compound, or may consist of a mixture of diolefinic and mono-olefinic compound, wherein the mono-olefinic compound is employed in minor proportion with respect to said diolefinic compound.

The temperature of polymerization may, in general, be somewhat lower than that employed in similar processes and usually may range from ordinary or room temperatures (25° C. to 30° C.) to as high as 70° C., depending upon the rate at which it is desired to carry out the polymerization.

As emulsifying agents there may be employed as stated above alkali metal salts of higher fatty acids (soaps) or alkali metal salts of alkylated benzene or naphthalene sulfonic acid or other known emulsifying agents such as Gardinol WA. The emulsion is preferably maintained at a pH below 7 and desirably within the range of 6.8 to 3.5. Regulators of polymerization, such as carbon tetrachloride or lauryl mercaptan may also be employed in the emulsion.

The polymerization of the polymerizable mixture may be carried out in the absence or in the presence of oxygen yielding polymerization catalysts such as sodium perborate, benzoyl peroxide, ammonium persulfate, hydrogen peroxide, etc.

This invention is illustrated, but not limited, by the following examples:

Example 1

64 grams of a mixture consisting of 70 parts by weight of butadiene and 30 parts by weight of benzalmalononitrile were emulsified to a fine milk in a mixture comprising 37.5 ml. of a MacIlvaine's buffer solution held at a pH of 6 or slightly less, 37.5 ml. of a 5% aqueous solution of Gardinol WA (sodium lorol sulfate), 0.5 gram of sodium perborate and 1.5 gram of carbon tetrachloride. The emulsion was shaken at a temperature of 35° C. for 5 days and then poured into alcohol. The precipitated polymer, upon filtration, washing with water and drying, was a white powder having a nitrogen content of 8.2%, a softening point of 155° C. and a melting point of 285° C. It is completely unaffected by all customary organic solvents, for example, gasoline, benzene, acetone, carbon tetrachloride, dioxane, ethyl acetate, ethylene chloride, etc.

When washed and dried, for example, on heated rolls provided with water sprays, the present copolymer has a general resemblance to a natural crepe rubber. It can be compounded and vulcanized and cured to obtain a variety of vulcanized products depending upon the vulcanizing conditions employed. The vulcanizates obtained with or without sulfur have good tensile strength and elasticity, high resistance to abrasion, and excellent thermal properties.

Example 2

A mixture consisting of 70 parts of butadiene and 30 parts of ethyl alpha-cyanocinnamate was polymerized according to the procedure in Example 1. There was obtained a 60% yield of a white powdery product having a nitrogen content of 3.06%, a softening point of 170° C. and a melting point of over 285° C. On vulcanizing the present copolymer with addition of lamp black, a soft, rubber-like mass of a high tensile strength and elasticity is obtained.

When butadiene was copolymerized with ethyl alpha-cyanocinnamate as described in this example except that the ratio of butadiene to the cyano compound was 9:1 instead of 7:3, the product obtained had a softening point of 155° C., and a melting point of above 285° C. and was obtained in a 50% yield. This shows that decreasing the proportion of ethyl alpha-cyanocinnamate in the mono mixture effects a decrease in the softening point as well as a decrease in the yield of the product and indicates the accelerating effect of the present nitriles on the polymerization reaction. The copolymer obtained from the 9:1 mixture of butadiene and ethyl alpha-cyanocinnamate does not, however, have the high degree of mechanical strength present in the 7:3 butadiene-nitrile copolymer. A higher yield of copolymer may be obtained by employing a higher temperature or by increasing the polymerization time.

Although the above examples are limited to the polymerization of butadiene in admixture with benzalmalononitrile or ethyl alpha-cyanocinnamate, butadiene may be similarly polymerized with other unsaturated nitriles having the general structure herein defined, for example, methyl alpha-cyanocinnamate, isopropyl alpha-cyanocinnamate, butyl and isobutyl alpha-cyanocinnamate, the amyl and isoamyl alpha-cyanocinnamate, the halogen-substituted benzalmalononitriles such as para-chlorobenzalmalononitrile, the alkyl-substituted benzalmalononitriles such as para-methylbenzalmalonitrile, etc. The use of such nitriles in copolymerization with butadiene likewise gives rubbery products which possess a high degree of thermal stability, excellent resistance to solvents, and good mechanical strength.

While this invention contemplates principally the copolymers from a binary polymerizable mixture of butadiene compounds and the above defined nitriles, I may in like manner form copolymers from ternary or polynary polymerizable mixtures comprising a butadiene compound, the unsaturated nitriles, herein specifically mentioned, and one or more additional mono-olefinic compounds such as styrene, the nuclearly substituted styrenes, the alpha-alkyl substituted styrenes, isobutylene, vinyl chloride, acrylonitrile, methacrylonitrile, methyl methacrylate, maleic anhydride, etc.

The invention is of general applicability to the copolymerization of any butadiene compound with the above defined unsaturated nitriles. Instead of employing butadiene as the polymerizable butadiene hydrocarbon, I may use, for example, such derivatives of butadiene as chloroprene, 2,3-dichlorobutadiene, isoprene, 2,3-dimethylbutadiene, 2-chloro-3-methylbutadiene, etc., the use of these derivatives likewise yielding rubber-like products of high thermal properties and good mechanical strength when they are copolymerized with the present unsaturated nitriles.

Other modes of applying the principle of my invention may be employed instead of those explained, change being made as regards the polymerization process, the temperatures, reaction media and the proportion of monomeric reactants employed, provided said reactants comprise a mixture of a butadiene compound and one or more of the present unsaturated nitriles in the presence or absence of other polymerizable materials, modifiers, etc.

As many different embodiments of this invention may be made without departing from the spirit and scope thereof, it is to be understood that I do not limit myself to the specific embodiments thereof except as defined in the appended claims.

What I claim is:

1. The process of polymerizing, in aqueous emulsion, a mixture containing from 1% to 50% by weight of a nitrile selected from the group:

$$R.CH=\underset{\underset{CN}{|}}{C}.R'$$

where R is phenyl and R' is selected from the group consisting of CN and COOX, where X is a saturated hydrocarbon radical of from 1 to 5 carbon atoms, the balance of said mixture consisting of a diene compound selected from the group:

$$H_2C=\underset{\underset{X}{|}}{C}-\underset{\underset{Y}{|}}{C}=CH_2$$

where X and Y are selected from the group consisting of halogen, hydrogen and methyl.

2. The process defined in claim 1, in which the emulsion contains an oxygen yielding compound as a polymerization catalyst.

3. The process of polymerizing in aqueous emulsion and at a temperature between 25° C. and 70° C. a mixture containing from 1% to 50% by weight of a nitrile selected from the group:

$$R.CH=\underset{\underset{CN}{|}}{C}.R'$$

where R is phenyl and R' is selected from the group consisting of CN and COOX, where X is a saturated hydrocarbon radical of from 1 to 5 carbon atoms, the balance of said mixture being substantially all butadiene-1,3.

4. The process defined in claim 3 in which the nitrile is employed in an amount of from 10% to 50% by weight of said mixture.

5. The process of polymerizing an aqueous emulsion of a mixture containing from 10% to 50% by weight of ethyl alpha-cyanocinnamate, the balance of said mixture being butadiene-1,3.

6. The process of polymerizing an aqueous emulsion of a mixture containing from 10% to 50% by weight of benzal malononitrile, the balance of said mixture being butadiene-1,3.

7. The process of polymerizing an aqueous emulsion of a mixture containing from 10% to 50% by weight of ethyl alpha-cyanocinnamate, the balance of said mixture being chloroprene.

8. A rubbery product comprising from 1% to 50% of a nitrile having the formula:

$$R-CH:\underset{\underset{CN}{|}}{C}-R'$$

where R is phenyl and R' is selected from the group consisting of CN and COOX, where X is a saturated hydrocarbon radical of from 1 to 5 carbon atoms, interpolymerized with a diolefinic compound having the structure:

$$H_2C:\underset{\underset{X}{|}}{C}.\underset{\underset{Y}{|}}{C}:CH_2$$

where X and Y are chosen from the group consisting of hydrogen, halogen and methyl, said diolefinic compound constituting the balance of said product.

9. A rubbery polymerization product comprising from 1% to 50% of a nitrile having the formula:

$$R.CH:\underset{\underset{CN}{|}}{C}.R'$$

where R is phenyl and R' is selected from the group consisting of CN and COOX, where X is a saturated hydrocarbon radical of from 1 to 5 carbon atoms, interpolymerized with butadiene-1,3, said butadiene-1,3 constituting the balance of said product.

10. A rubbery polymerization product of butadiene-1,3 and from 10% to 50% of benzal malononitrile, the balance of said product being butadiene-1,3.

11. A rubbery polymerization product of butadiene-1,3 and from 10% to 50% of ethyl alpha-cyanocinnamate, the balance of said product being butadiene-1,3.

DAVID T. MOWRY.